UNITED STATES PATENT OFFICE.

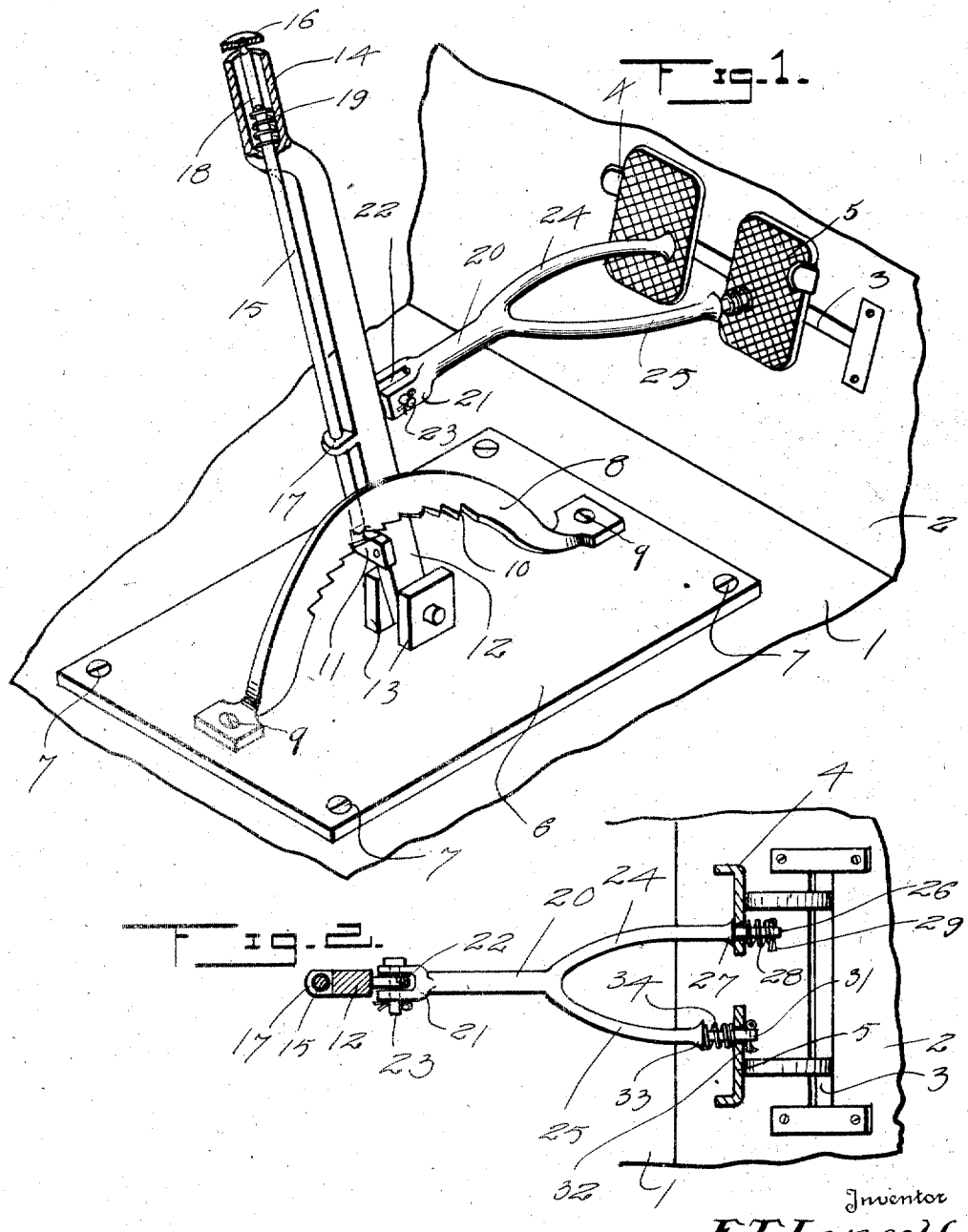

FRED T. LANGOLF, OF ELWOOD, INDIANA, ASSIGNOR OF ONE-HALF TO WILLIAM A. RAUCH, OF ELWOOD, INDIANA.

AUTOMOBILE-CONTROLLING DEVICE.

1,275,706.  Specification of Letters Patent.  Patented Aug. 13, 1918.

Application filed September 28, 1917. Serial No. 193,739.

*To all whom it may concern:*

Be it known that I, FRED T. LANGOLF, a citizen of the United States, residing at Elwood, in the county of Madison and State of Indiana, have invented certain new and useful Improvements in Automobile-Controlling Devices; and I do hereby declare the following to be a full, clear, and exact description of the invention, such as will enable others skilled in the art to which it appertains to make and use the same.

This invention relates to improvements in an automobile controlling device and has for one of its objects the provision of a device of this character whereby the operator of the automobile may readily and conveniently manipulate the clutch and brake pedals by hand, thus providing means whereby a legless person may operate an automobile.

Another object of this invention is the provision of a controlling lever operatively connected with the clutch and brake foot pedals so that upon swinging said lever upon its pivot the clutch will be disengaged and then the brake applied.

A further object of this invention is the provision of means whereby the clutch foot pedal may be moved prior to moving the brake foot pedal and held in this position so that the operator can readily and conveniently use his hand for shifting or changing the gears to obtain the various speeds upon an automobile.

A further object of this invention is the provision of a novel means of connecting the operating or controlling lever to the brake foot pedal so that the same will be gradually operated to prevent the abrupt stopping of the automobile.

A still further object of this invention is the provision of an automobile controlling device of the above stated character, which will be simple, durable and efficient, and which may be manufactured and sold at a comparatively low cost.

With these and other objects in view, it will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:

Figure 1 is a perspective view partly in section of an automobile controlling device constructed in accordance with this invention.

Fig. 2 is a longitudinal sectional view of the same.

Referring in detail to the drawing, the numeral 1 indicates the floor board of an automobile having the usual inclined portion 2 provided with a slot or opening 3 for permitting the clutch foot pedal 4 and the brake foot pedal 5 to operate therethrough. The foregoing relates to a well known construction of an automobile to which my invention is applied.

A base plate 6 is secured to the floor board 1 by fasteners 7 and has secured thereon a semi-circular bar 8 by fasteners 9. The bar 8 is provided with a plurality of notches or teeth 10 upon its under face for coöperation with a pivoted dog 11 carried by a controlling lever 12. The controlling lever 12 has its lower end pivoted between a pair of relatively spaced ears 13 formed upon the base plate 6. The upper end of the controlling lever 12 is provided with a hollow hand grip 14 through which extends a releasing rod 15. The releasing rod 15 has secured to its upper end a hand grip 16 while its opposite end is secured to the pivoted dog 11. A lug 17 is formed upon the controlling lever 12 and is provided with an aperture to slidably receive the rod 15 to prevent the same from moving out of parallelism with the controlling lever. A pin 18 is secured to the rod 15 within the hollow hand grip 14 and has one end of a coiled spring 19 disposed thereagainst, while the opposite end of the coiled spring is seated within the bottom wall of the hollow hand grip 14 for normally holding the pivoted dog 11 in engagement with the teeth 10 upon the bar 8 to prevent the controlling lever from accidentally moving upon its pivot.

A forked arm 20 has formed upon one end thereof a pair of relatively spaced ears 21 which receive an ear 22 formed upon the controlling lever 12. The ears 21 and 22 are connected by a bolt 23. The arm portion 24 of the bifurcated arm 20 is of greater length than the arm portion 25 and has formed thereon an extension 26 which extends through an aperture in the clutch foot pedal 4. A shoulder 27 is formed upon the arm portion 24 and engages the front face of the clutch foot pedal 4, as clearly illustrated in Figs. 1 and 2, for the purpose of pushing upon the clutch foot pedal 4 upon swinging the controlling lever 12 forwardly. A coiled spring 28 surrounds the extension 26 and is held thereon by cotter pins 29 to prevent undue movement of the extension 26 within the aperture of the clutch foot pedal 4.

An extension 31 is formed upon the end of the arm portion 25 of the forked arm 20 and extends through an aperture in the brake foot pedal 5 and receives therethrough a cotter pin or like fastener 32 to prevent the extension from disengaging the aperture of said pedal. A shoulder 33 is formed upon the arm portion 25 and spaced from the front face of the brake foot pedal 5 and has one end of a coiled spring 34 disposed thereagainst, while the opposite end of the coiled spring rests upon the front face of the foot brake pedal so as to provide a construction to permit the forked arm 20 to have slight movement before the brake pedal 5 will be actuated.

In operation, when it is desired to stop the automobile, the pivoted dog 11 is disengaged from the teeth 10 upon the bar 8 by pushing downwardly upon the rod 15. The controlling lever is then swung forwardly upon its pivot, causing the forked arm 20 to push upon the clutch pedal 4 disengaging the clutch of the automobile (not shown) and gradually pressing upon the brake pedal 5 to apply the brake of the automobile (not shown). The gradual movement or operation of the brake pedal is obtained by the coil spring 34 interposed between the shoulder 33 and the front face of the pedal, so as to prevent abrupt stopping of the automobile and also obviating the danger of applying the brake prior to disconnecting or rendering the clutch of the automobile inoperative.

When it is desired to change the speed gears of the automobile, the controlling lever 12 is moved forwardly a short distance sufficient to cause the forked arm to move the clutch pedal 4, rendering the clutch of the automobile (not shown) inoperative so that the operator may then readily and conveniently operate the usual speed changing gear lever. When the controlling lever is only moved a short distance, the clutch is disengaged and the extension 31 upon the arm portion 25 is of sufficient length to permit movement of the forked arm 20 to operate the clutch pedal without operating the brake pedal.

From the foregoing description taken in connection with the accompanying drawing, it will be noticed that means has been provided whereby a legless person may readily and conveniently operate an automobile.

While I have shown and described the preferred embodiment of my invention, it will be understood that minor changes in construction, combination and arrangement of parts may be made without departing from the spirit and scope of the invention as claimed.

Having thus described my invention, what I claim is:

1. An automobile controlling device comprising a controlling lever, and means connecting the controlling lever to the clutch and foot pedals of an automobile, said means operating the clutch pedal prior to the foot pedal.

2. An automobile controlling device comprising a controlling lever, a bifurcated arm pivoted to said controlling lever and connected to the clutch and brake pedals of an automobile to operate the clutch pedal prior to the foot pedal.

3. An automobile controlling device comprising a base plate, a rack bar secured to said plate, a controlling lever pivoted to said base plate, a pivoted dog on said controlling lever and engaging the rack bar to hold said lever against accidental movement, a spring actuated rod connected to the controlling lever and dog for disengaging said dog from the teeth of the rack bar, and means connecting the controlling lever to the clutch and brake pedals of an automobile to actuate the same upon movement of the controlling lever.

4. An automobile controlling device comprising a controlling lever, a forked arm pivoted to said controlling lever, an extension formed upon one arm portion of the forked arm and extending through an aperture in the clutch pedal of an automobile, a shoulder formed on said arm portion for engaging the front face of the clutch pedal, a coiled spring surrounding said extension, an extension formed on the other arm portion of the forked arm and extending through an aperture in the brake pedal, a fastener extending through said extension, a shoulder formed on the second mentioned arm portion of the forked arm and spaced from the front face of the brake pedal, and a coiled spring interposed between the last named shoulder and the front face of the brake pedal to permit the gradual application of the brake of the automobile upon movement of the controlling lever.

In testimony whereof I affix my signature in presence of two witnesses.

Witnesses:
FRED T. LANGOLF.

HENRY C. NUDING,
SAMUEL G. VANNEMAN.